(12) United States Patent
Kim

(10) Patent No.: US 6,736,069 B2
(45) Date of Patent: May 18, 2004

(54) METHOD FOR GENERATING ENERGY BY USING EXOTHERMIC REACTION OF METAL

(76) Inventor: Chang-Sun Kim, 358-7, Namchon-dong, Namdong-qu, Inchun-shi (KR)

( * ) Notice: Subject to any disclaimer, the term of this patent is extended or adjusted under 35 U.S.C. 154(b) by 41 days.

(21) Appl. No.: 10/106,064

(22) Filed: Mar. 27, 2002

(65) Prior Publication Data

US 2003/0106452 A1 Jun. 12, 2003

(30) Foreign Application Priority Data

Dec. 3, 2001 (KR) .................................... 2001-0075913

(51) Int. Cl.$^7$ .............................. F42D 3/00; F42B 3/00; F01K 25/06
(52) U.S. Cl. ........................ 102/301; 102/313; 102/314; 102/293; 60/649
(58) Field of Search ................................ 102/306, 430, 102/301, 305, 293, 313, 314, 332; 60/649, 645, 670

(56) References Cited

U.S. PATENT DOCUMENTS

| | | | | |
|---|---|---|---|---|
| 3,882,324 A | * | 5/1975 | Smolker et al. | 102/202.5 |
| 5,072,647 A | * | 12/1991 | Goldstein et al. | 102/440 |
| 5,212,343 A | * | 5/1993 | Brupbacher et al. | 102/323 |
| 5,431,105 A | * | 7/1995 | Wilkinson | 102/430 |
| 6,209,457 B1 | * | 4/2001 | Kenworthy et al. | 102/306 |
| 6,237,340 B1 | * | 5/2001 | Kim | 60/649 |
| 2002/0121081 A1 | * | 9/2002 | Cesaroni et al. | 60/251 |

* cited by examiner

Primary Examiner—Michael J. Carone
Assistant Examiner—James S. Bergin
(74) Attorney, Agent, or Firm—Birch, Stewart, Kolasch & Birch LLP

(57) ABSTRACT

Disclosed herein is a method for generating energy by using exothermic reaction of metal, comprising the steps of reacting an oxidant containing mostly water with combustion substances mainly containing light metals to generate hydrogen; reacting generated hydrogen with nitric acid, sulfuric acid, chlorine peroxide, metal nitrate, metal perchlorate, metal sulfate, and hydrogen peroxide to generate water and heat; continuously repeating the above two steps with the use of water to gradually increase explosive power, and to a method for utilizing generated energy. The method can generate increased amounts of energy by repeatedly reacting oxidants such as water, liquid acid, and metal salt with combustion substances containing mostly light metals, and has economic advantages in that inexpensive substances such as light metal and oil are used as combustion substances.

3 Claims, No Drawings

METHOD FOR GENERATING ENERGY BY USING EXOTHERMIC REACTION OF METAL

BACKGROUND OF THE INVENTION

1. Field of the Invention

The present invention relates to a method for generating energy by using an exothermic reaction of metal, which improves a principle of the metal fuel propulsive body according to claim 2 in U.S. Pat. No. 6,237,340B1, "Method for reusing a substance's thermal expansion energy" issued to the present inventor.

Particularly, the present invention pertains to a method for generating energy by using an exothermic reaction of metal, comprising the steps of reacting oxidants containing mostly water with combustion substances containing mostly light metal to generate hydrogen; reacting generated hydrogen with nitric acid, sulfuric acid, chlorine peroxide, metal nitrate, metal perchlorate, metal sulfate, and hydrogen peroxide to generate water and heat; continuously repeating the above two steps with the use of generated water to gradually increase explosive power, and to a method for utilizing generated energy (explosive power).

2. Description of the Prior Art

Generally, an exothermal reaction can be used as propulsive energy in a rocket. For example, conventionally, the propulsive energy in a rocket is obtained by an explosion, which is generated by reacting source substances of explosive energy such as liquid oxygen, hydrogen peroxide, liquid hydrogen, ammonia, gas for combustion, oil fuel, explosives, gun powders with nonmetal substances and organic substances.

However, the prior technology as described above, has disadvantages in that the source substances of explosive energy are expensive and have a large volume and a heavy weight.

SUMMARY OF THE INVENTION

Therefore, it is an object of the present invention to avoid disadvantages of the prior arts, and to provide a method for generating energy by using an exothermic reaction of metal, comprising the steps of reacting an oxidant containing mostly water with a combustion substance containing mostly light metal to generate hydrogen; reacting generated hydrogen with nitric acid, chlorine peroxide, sulfuric acid, metal nitrate, metal perchlorate, metal sulfate, and hydrogen peroxide to generate energy. The method provides energy using light and inexpensive substances.

It is another object of the present invention to provide a method for economically generating energy by using an exothermic reaction of metal with the use of inexpensive metals, which can be applied to crush a structure or a rock bed without a large explosion noise or the scattering of crushed debris.

DETAILED DESCRIPTION OF THE INVENTION

A better understanding of the present invention may be obtained in light of the following examples which are set forth to illustrate, but are not to be construed to limit the present invention.

EXAMPLE 1

Either sodium nitrate ($NaNO_3$) or magnesium nitrate ($Mg(NO_3)_2$), and water ($H_2O$) are reacted with sodium (Na) in a chain reaction manner. The reactions can be expressed by the following equations 1a, 1b, and 1c, in which the metal element (Na) serves as a combustion substance while sodium nitrate or magnesium nitrate and water act as oxidants.

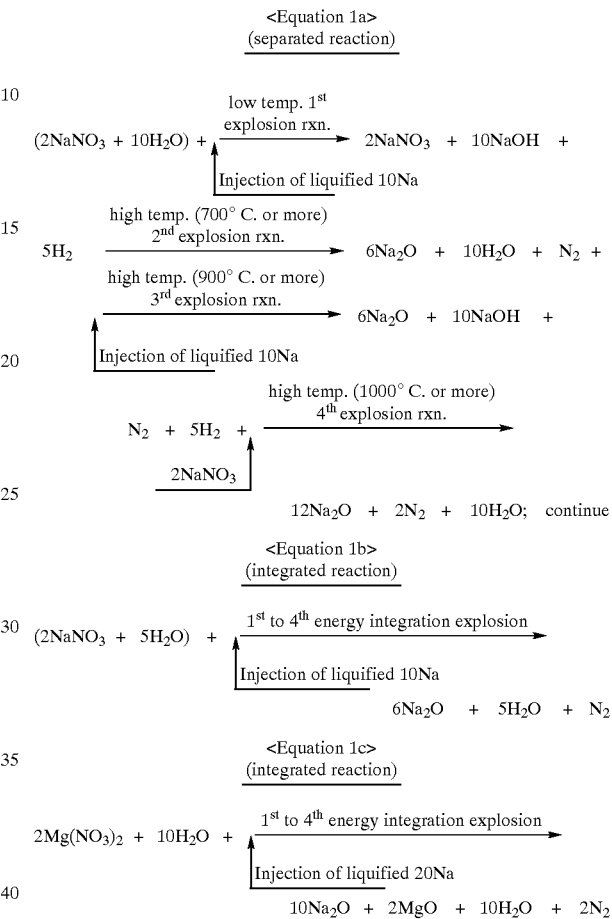

EXAMPLE 2

Sodium perchlorate ($NaClO_4$) and water ($H_2O$) are reacted with sodium (Na) in a chain reaction manner. The reactions can be expressed by the following equations 2a and 2b, in which the metal element (Na) serves as a combustion substance while sodium perchlorate and water act as oxidants.

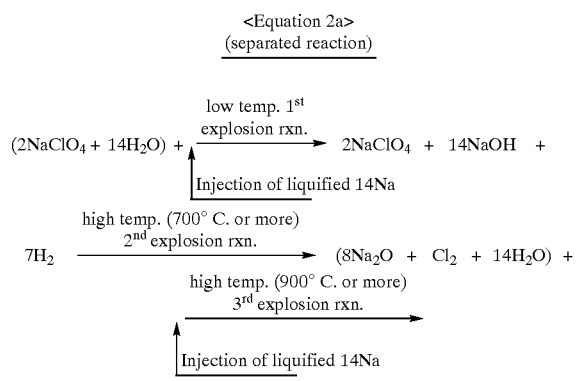

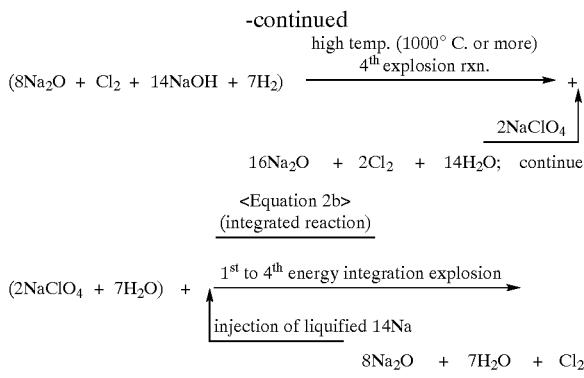

EXAMPLE 3

Nitric acid (HNO$_3$) and water (H$_2$O) are reacted with sodium (Na) in a chain reaction manner. The reactions can be expressed by the following equations 3a and 3b, in which the metal element (Na) serves as a combustion substance while nitric acid and water act as oxidants.

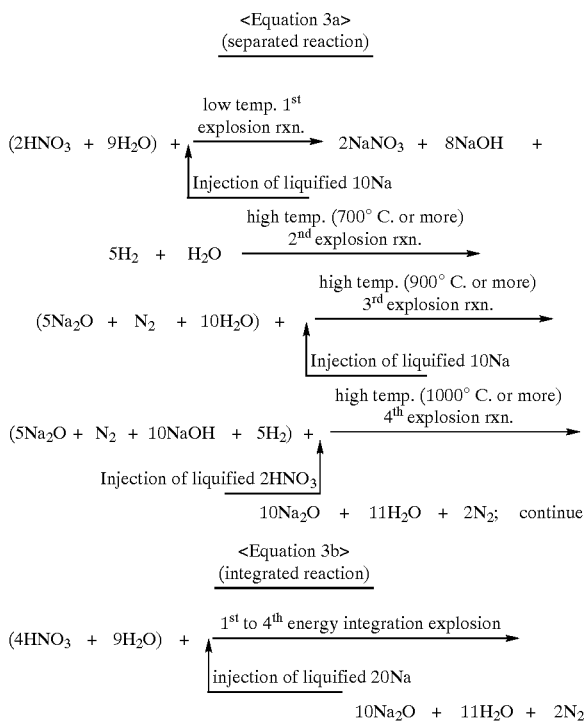

EXAMPLE 4

Perchloric acid (HClO$_4$) and water (H$_2$O) are reacted with sodium (Na) in a chain reaction manner. The reactions can be expressed by the following equations 4a and 4b, in which the metal element (Na) serves as a combustion substance while perchloric acid and water act as oxidants.

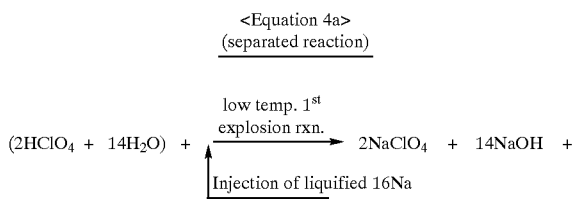

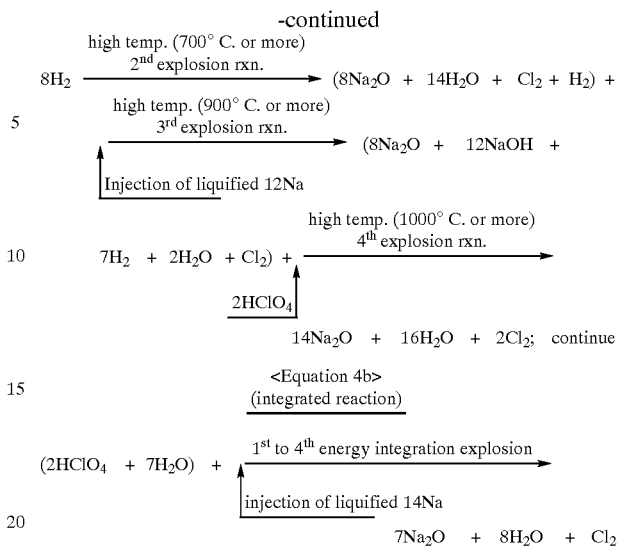

EXAMPLE 5

Sulfuric acid (H$_2$SO$_4$) and water (H$_2$O) are reacted with sodium (Na) in a chain reaction manner. The reactions can be expressed by the following equations 5a and 5b, in which the metal element (Na) serves as a combustion substance while sulfuric acid and water act as oxidants.

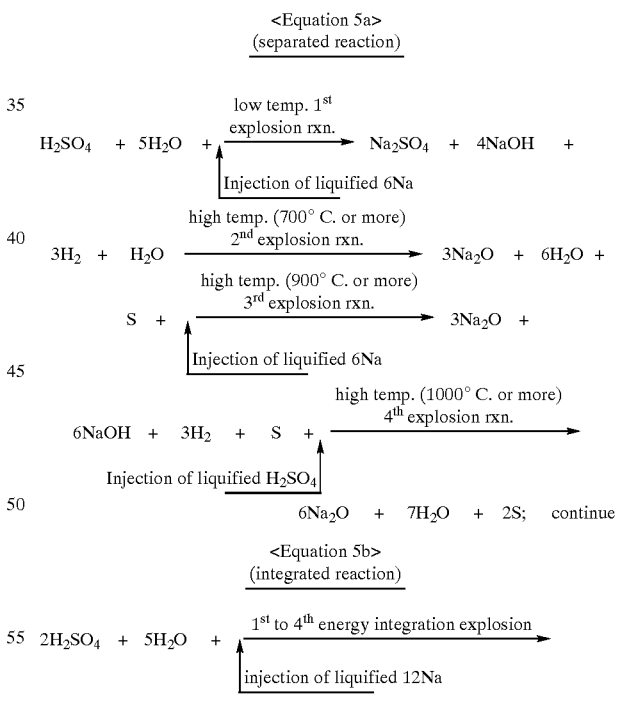

EXAMPLE 6

Perchloric acid (HClO$_4$) and water (H$_2$O) are reacted with reactive metal (Na) and nonmetal combustion substances (additives) selected from the group consisting of ammonia, gas for combustion, fuel oil for combustion, and hydrogen in a chain reaction manner. The reactions can be expressed by the following equations 6a to 6g, in which the reactive metal serves as a combustion substance while perchloric acid and water act as oxidants.

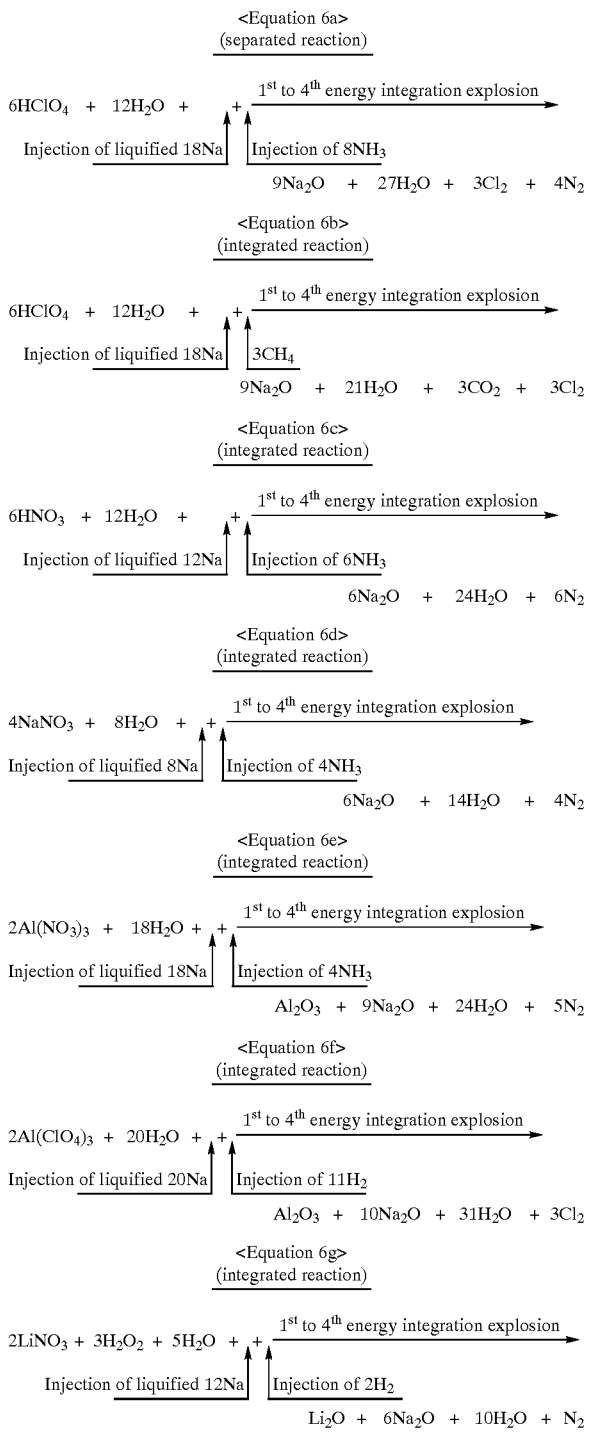

EXAMPLE 7

When a mixture of metal powder and metal salt powder is subjected to shock heat to initiate a chain reaction without using water, little gas is generated while the metal and metal salt are in a gas phase to produce a pressure which is large enough to crush a structure or a rock bed without a large explosion noise or the scattering of debris. The reactions can be expressed by the following equations 7a to 7e.

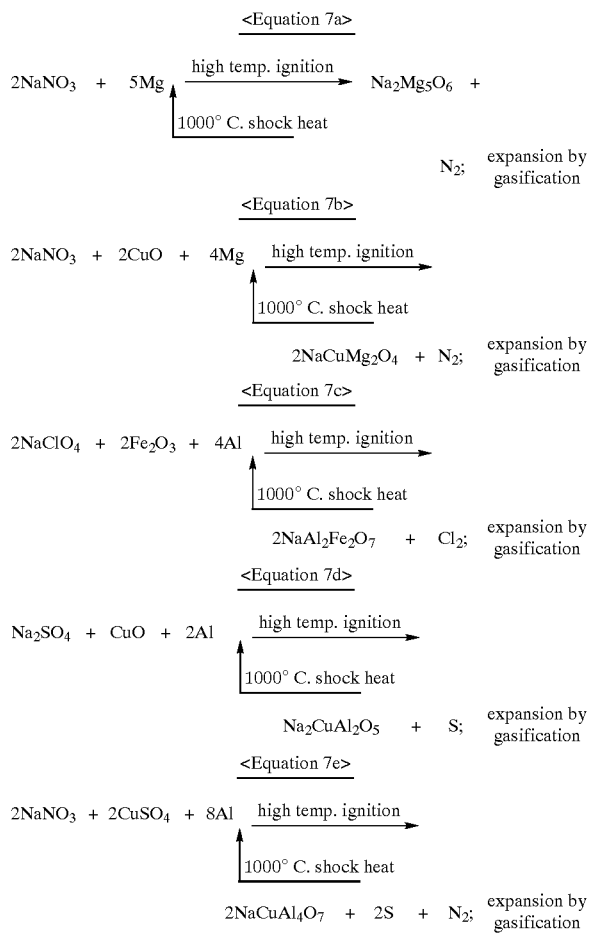

Example 7 is characterized in that a bond reaction is continuously conducted by adding a shock heat to reactions 7a to 7e to generate high temperature energy. The high temperature energy expands a small amount of a certain gas and gasifies the metal salt, thereby causing significant expansion of products, but having excellent expansion effect only in the small sealant space because the expansion limitation is low. Therefore, these reactions can be used to crush a rock bed without a large explosion noise or scattering of debris, and are less harmful to the environment and humans over conventional methods.

<Substances Used in the Present Invention>

A: Metal Nitrates

Sodium nitrate ($NaNO_3$), potassium nitrate ($KNO_3$), lithium nitrate ($LiNO_3$), calcium nitrate ($Ca(NO_3)_2$), magnesium nitrate ($Mg(NO_3)_2$), aluminum nitrate ($Al(NO_3)_3$), barium nitrate ($Ba(NO_3)_2$), iron nitrate ($Fe(NO_3)_3$), manganese nitrate ($Mn(NO_3)_2$), copper nitrate ($Cu(NO_3)_2$), and the like.

B: Metal Perchlorates

Potassium perchlorate ($KClO_4$), sodium perchlorate ($NaClO_4$), lithium perchlorate ($LiClO_4$), calcium perchlorate ($Ca(ClO_4)_2$), magnesium perchlorate ($Mg(ClO_4)_2$), strontium perchlorate ($Sr(ClO_4)_2$), barium perchlorate ($Ba(ClO_4)_2$), iron perchlorate ($Fe(ClO_4)\ 3$), manganese perchlorate ($Mn(ClO_4)_2$), copper perchlorate ($Cu(ClO_4)_2$), aluminum perchlorate ($Al(ClO_4)_2$), zinc perchlorate ($Zn(ClO_4)_2$), and the like.

C: Metal Oxides

Potassium oxide ($K_2O$), sodium oxide ($Na_2O$), lithium oxide ($Li_2O$), calcium oxide (CaO), copper oxide (CuO), magnesium oxide (MgO), strontium oxide (SrO), barium oxide (BaO), iron oxide ($Fe_2O_3$), manganese oxide ($MnO_2$), zinc oxide (ZnO), and the like.

D: Metal Sulfates

Potassium sulfate ($K_2SO_4$), sodium sulfate ($Na_2SO_4$), lithium sulfate ($Li_2SO_4$), strontium sulfate ($SrSO_4$), calcium sulfate ($CaSO_4$), magnesium sulfate ($MgSO_4$), barium sulfate ($BaSO_4$), iron sulfate ($FeSO_4$), manganese sulfate ($MnSO_4$), copper sulfate ($CuSO_4$), aluminum sulfate ($AlSO_4$), zinc sulfate ($ZnSO_4$), and the like.

E: Liquid Oxidants

Water ($H_2O$), hydrogen peroxide ($H_2O_2$), nitric acid ($HNO_3$), perchloric acid ($HClO_4$), sulfuric acid ($H_2SO_4$), and the like.

F: Combustion Substances (Light Metals)

A lump type or a powder type of a reactive metal such as potassium (K), lithium (Li), sodium (Na), magnesium (Mg), titanium (Ti), calcium (Ca), aluminum (Al), and chrome (Cr).

G: Other Additives

Combustible nonmetal such as hydrogen ($H_2$), ammonia ($NH_3$), oil for combustion, toluene, benzene, petroleum, hydrocarbons.

In examples 1 to 5, oxidants such as water, hydrogen peroxide, nitric acid, perchloric acid, sulfuric acid, metal nitrate, metal sulfate, and metal perchlorate are directly reacted with reactive metals as combustion substances. These bond reactions comprise an A type reaction in which gas expansion pressure is raised stepwise and a B type reaction in which the bond reaction is integrally carried out, and provides energy, for example a propulsive force of a rocket, by use of expansion pressure of the substances and water upon supplying heat energy to the substances and water.

In equations 6a to 6f, the oxidant such as water, hydrogen peroxide, nitric acid, sulfuric acid, metal nitrate, metal perchlorate, and metal sulfate is reacted with the reactive metal and combustible nonmetal to generate an explosion energy.

The present invention provides a method for increasing energy by repeating a bond reaction of oxidants such as water, hydrogen peroxide, liquid acid, metal salt with light metal such as combustion substances. The method has economic advantages in that inexpensive substances such as light metal and oil are used as the combustion substance.

Furthermore, it can be seen from equation 7 that the method can be used to crush a structure or a rock bed without a large explosion noise or the scattering of debris.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for generating an explosion energy by using an exothermic reaction of metal, comprising:

a first reaction process in which an elementary oxidant based on water is reacted with a combustion substance based on light metal to generate hydrogen;

a second reaction process in which the hydrogen generated from the 1st reaction is reacted with an oxidant to generate water, said oxidant being selected from the group consisting of nitric acid, chlorine peroxide, sulfuric acid, metal nitrate, metal perchlorate, metal sulfate, hydrogen peroxide, and combinations thereof;

a third reaction process in which the water generated from the 2nd reaction is reacted with a light metal element to generate hydrogen, said light metal element being selected from the group consisting of potassium (K), lithium (Li), sodium (Na), magnesium (Mg), titanium (Ti), calcium (Ca), aluminum, (Al), chromium (Cr), and combinations thereof;

a fourth reaction process in which the hydrogen generated from the 3rd reaction is reacted with an oxidant selected from the group consisting of nitric acid, chlorine peroxide, sulfuric acid, metal nitrate, metal perchlorate, metal sulfate, hydrogen peroxide and combinations thereof, wherein said second and third reaction process are carried out in a repeating and consecutive manner.

2. The method according to claim 1, wherein combustion substances are a lump or a powder of reactive metals comprising potassium (K), lithium (Li), sodium (Na), magnesium (Mg), titanium (Ti), calcium (Ca), aluminum, (Al), and chromium (Cr).

3. The method according to claim 1, wherein combustion substances combined with nonmetals comprising hydrogen ($H_2$), ammonia ($NH_3$), oil for combustion, toluene, benzene, petroleum, hydrocarbons, and reactive metals comprising potassium (K), lithium (Li), sodium (Na), magnesium (Mg), titanium (Ti), calcium (Ca), aluminum, (Al), and chromium (Cr) are used.

* * * * *